3,669,714
PLATING OF POLYSTYRENE
Donald Field Wiley, Big Spring, Tex., assignor to Cosden Oil & Chemical Company, Big Spring, Tex.
No Drawing. Filed June 17, 1969, Ser. No. 834,130
Int. Cl. B44d 1/092; C08f 15/00; C23b 5/60
U.S. Cl. 117—47 A
5 Claims

ABSTRACT OF THE DISCLOSURE

The brightness of metal plating upon polystyrene molded parts is greatly enhanced by blending a small quantity of less than about 15% of a terpolymer of acrylonitrile, butadiene and styrene with the polystyrene before molding. The polystyrene before blending preferably contains a small quantity of preformed rubber in the polymer.

---

This invention relates to plating of polystyrene, preferably high impact polystyrene comprising polystyrene polymerized from styrene monomer containing from about 1 to about 20% of preformed rubber.

In the plating of polystyrene as described in a copending application, Ser. No. 726,270, filed Apr. 8, 1968, now Pat. No. 3,533,828 of the present assignee, a preferred polymer to be plated is polystyrene or its impact. Such polymer is first treated to selectively absorb in the surface a small quantity of a solvent for the molded plastic. Such solvent adsorption sufficiently swells the surface to allow subsequent oxidation whereby it will then take a plating sensitizer catalyst to then allow a strongly adhered metal plating, a result that had not heretofore been achieved in the art.

It is now found, according to the present invention, that surface appearance, particularly brightness characteristics of the prior plating upon the preferred polymer to be plated comprising polystyrene or rubber-modified polystyrene, are greatly improved by incorporating by blending with the polymer a small quantity of ABS polymer. Such ABS polymer is a terpolymer formed by the polymerization of about 1 to 40 parts of prepolymerized rubber such as polybutadiene in 99-60 parts of styrene and acrylonitrile monomers of which the styrene is usually present in quantity of about 60–90% of the total monomers and the acrylonitrile is 40–10% of the total monomers, the proportions being by weight. The rubber content is preferably in the range of about 1 to about 20% and the ABS polymer is made by suspension polymerization, as is preferred, increasing up to about 40% as the upper limit when the ABS polymer is made by emulsion polymerization. It was found that addition of ABS polymer to the polystyrene or polystyrene impact greatly enhances the surface characteristics of plating formed upon such molded products. Thus, while pure polystyrene or impacts of polystyrene moldings which have been plated are satisfactory, there are many moldings of this material in which the appearance of the plating is desirably improved, even though the metal plating is firmly adherent to the plastic. When a small quantity of ABS polymer is blended with the polystyrene or the preferred polystyrene, impact, prior to plating, the metal plated surface of their moldings, particularly upon difficult complex parts, are very greatly improved. Thus, the surface has a higher gloss or shine and takes on the appearance of a very fine electroplating, superior to direct plating upon styrene or styrene impacts, as described in said prior application.

The ABS additive hereof is used as a blend with the polystyrene preferably in small quantity as low as 0.2% up to about 10% based on the total plastic content. The increasing quantity from such small quantity of about 2% to about the limit showing a steady improvement in surface appearance of the plating formed upon molded products formed from such blend. Above the 10% limit the strength of the plating i.e. the firm adhesion to the plastic surface, tends to decrease so that the plating progressively is easier to remove or pull off of the plastic, and the plating becomes more easily damaged. However, the appearance of the plating continues to improve somewhat with addition of ABS contents so that the upper limit of ABS content in the polystyrene or polystyrene and rubber blended for plating, where strong adhesion of the plating to the plastic surface is not critical, may range from 3% up to as high as 15% ABS blended with the polystyrene or polystyrene and rubber. As a practical lower limit, considering that the increase in surface appearance is progressive with increased ABS content, about 1 to 5% ABS is the most practical. Even that lower limit, considering that a good, strongly adherent plating is available according to the prior invention even without any ABS blend with the polystyrene, would be varied somewhat with the specific needs of the particular object to be plated. ABS polymer is not generally considered even to be compatible with polystyrene or polystyrene and rubber. However, for purposes of the present invention, it is found that the ABS does blend satisfactorily in quantity ranging up to about 15% of the total polymer blend.

In forming the blend of the polystyrene or polystyrene and rubber with the ABS polymer, usually the preformed polymers in bead form or crushed particles, or even pellets are first blended in the said selected proportions to produce a homogeneous dry particle mix containing a homogeneous blend of both polymers. The blended mix is then extruded with heat into continuous strands, which are then chopped into pellets comprising the fused blend of the ABS and polystyrene or polystyrene and rubber.

Such pellets shipped to the molder are then molded to the desired part or shape to be subsequently plated. It has been found as described in the copending application Ser. No. 726,270, filed Apr. 8, 1968, that treatment of the smooth molded polymer with a small quantity of solvent for the polymer, the solvent being maintained in a dilute state in a fluid carrier which is a non-solvent for the polymer, allows retention of the solvent such as by trace absorption of the solvent into the smooth surface of the plastic, thereby modifying and conditioning the polymer surface to accept a firmly-adherent metal plating thereon.

The polymer surface-modifying solvent generally has non-polar characteristics. However, it is within the scope of this invention for said solvent to have polar characteristics. For liquid phase treatment it is either normally a liquid at ambient temperatures, or may be condensed to liquid form at moderately low temperatures, e.g., on the order of −10° C. or higher, and acts like a liquid when dissolved in the carrier fluid in the stated concentrations. For vapor phase treatment the solvent is either normally gaseous or is vaporizable at any practical treating temperatures up to the stability limit of the polymer, such as about 200° F. at moderate pressures from 0.1 to 100 p.s.i.g., and preferably for liquid phase treatment the solvent is a liquid at ambient temperatures; and for vapor phase treatment it may be a gas at temperatures up to 100° C.

Of the numerous solvents for the polymer useful herein, are the more common aromatic hydrocarbons, e.g., those usually having about 6 to 24 carbon atoms such as benzene, toluene, ethylbenzene, o-, m- or p-xylenes, diethylbenzenes, divinylbenzenes, trimethylbenzenes, triethylbenzenes, ethyl styrene, tetramethylbenzene, tetraethylbenzene, styrene monomer, alphamethylstyrene, vinyl toluene as well as other liquid aromatics saturated and unsaturated in the side chain. Although as stated, the solvent is generally non-polar, the solvent may be predominantly composed of non-polar groups such as aromatic hydrocarbon groups which can be substituted with some polar type radicals insufficient in quantity, type, or distribution to destroy the solvent characteristic for the polystyrene. Such polar groups may be amine, hydrazino, oximino, sulfur containing groups (e.g., sulfide, sulfo, sulfone, etc.), nitrile, alkoxy or halo, such as chlorine, fluorine, bromine or iodine, typical examples being aniline, methylaniline, phenylhydrazine, methyl pyrolidone, anisidine, p-chloro toluene, cyano benzene, p-ethoxy toluene. Saturated alkanes and alkenes, typically $C_5$–$C_{15}$ alkanes and alkenes may also be used, such as the pentanes, octanes, decanes and corresponding $C_4$–$C_{18}$ alkenes such as butenes, pentenes, isoprenes, heptenes and decenes; alicyclic including terpenes having 5 to 24 carbon atoms such as cyclopentane, cyclohexane, methyl cyclohexane, cyclopentene, cyclohexene, methylcyclohexene, cyclopentadiene, dicyclopentadiene, dipentene, bornylene, alpha-pinene, p-methene, camphene, alpha-terpinene, butylcyclohexane, diethylcyclohexane; and halogenated hydrocarbons having 1 to 12 carbon atoms, preferably chlorinated hydrocarbons as well as mixed chlorinated-fluorinated hydrocarbons, typically chloroform, carbon tetrachloride, perchloroethylene, chlorobenzene, chlorinated toluene, fluorinated hydrocarbons (e.g., trichloromonofluoromethane, dichlorodifluoromethane, monochlorotrifluoromethane, etc.) and the like.

In additin to the pure hydrocarbon and halogenated hydrocarbon, commercial non-polar polystyrene solvent mixtures such as petroleum ethers, i.e., $C_4$–$C_{10}$ naphthas, mixed aromatic $C_6$–$C_9$ distillates, terpene oils, mixed xylenes, mixtures of benzene and toluene and halogenated lower $C_1$–$C_3$ hydrocarbon mixtures including mixed commercial carbon tetrachloride, chloroform, methylene dichloride and fluoroethylenes, and mixed chloro-fluoromethylenes, ethylenes and propylenes per se are useful polystyrene solvents herein.

It should be noted that when the polystyrene base polymer is an impact material having a diene elastomer incorporated therein, best results are obtained when the solvent is a solvent for the elastomer as well as for polystyrene per se. The above-described solvents meet this criteria.

The pretreatment step, by which the polymer material is treated with a solvent, may be a liquid phase treatment in which the polymer to be plating-conditioned is wet, such as by spraying or immersing the plastic in a dilute liquid solution or carrier of the solvent for the plastic in a liquid carrier fluid which can contain water and a water-miscible organic liquid in which the polystyrene is insoluble. The water in such solution can be used as a control of excessive solubility to reduce the solubility of the polystyrene solvent in the carrier liquid so that, in the quantity in which the polystyrene solvent is present, from 0.25 to 25%, more usually 1 to 15% by volume, the solubility of the polymer solvent is limited to the organic liquid carrier, but is still clearly soluble therein. Such a polystyrene treating solution for liquid phase treatment is a clear, homogeneous solution, consisting of a ternary system of (a) water-insoluble polystyrene solvent, (b) water-miscible polystyrene non-solvent in which the polystyrene solvent is soluble in the quantity used, and (c) water sufficient to reduce the solubility of the polystyrene solvent in the carrier liquid, but not beyond its saturation therein.

The organic carrier liquid is a substantial non-solvent for the polymer. The organic component is most usually a polar liquid and may be non-solvent for the polystyrene per se without any water. When the organic polar liquid has some solubility for polystyrene, then water may be added to entirely inhibit the polystyrene solubility therein. The added water in the solution of polystyrene solvent in the carrier liquid, as stated, also assists in controlling the desired rate of solvent retention by the polystyrene surfaces exposed thereto.

Certain more common commercial solvents, such as isopropanol, ethanol and acetone are not only improved for these reasons as carrier liquids by a substantial water content, but such commercial organic solvents are far more economically available with substantial water contents. Consequently, it is convenient and desirable, but not essential, that the carrier liquid be water soluble.

Typically useful polystyrene non-solvent liquids are water-soluble lower aliphatic alcohols and ketones which are generally non-volatile at the treating temperatures. For this purpose I may use lower monohydric alkanols such as methanol, ethanol, propanol and isopropanol, n-butanol, t-butanol; polyhydric alkanols having 2 to 6 carbon atoms such as ethylene glycol, propylene glycol, butylene glycol and glycol ethers such as diethylene glycol and dipropylene glycol; lower aliphatic ketones such as acetone, diethyl ketone and methylethylketone; and other solvents such as dimethyl formamide, dimethyl sulfoxide and diethylsulfoxide. In general the quantity of hydrocarbon in the solution with polar liquid is adjusted in the range stated and the time of exposure of the molded polystyrene product is adjusted to allow absorption from the solution so that the surface of the polystyrene absorbs .01 to 3.0, preferably about 0.05 to 0.5 gram per square foot of plastic surface in an immersion time of as little as 15 seconds, but usually on the order of one to ten minutes, the time and the quantity being determined upon the differences in weights of the polymer before and after treatment with the non-polar solvent and drying.

The temperature, as stated, in either case is regulated to be below the polystyrene softening point; that is, below about 200° F., and the time of exposure, too, is also a useful regulation to control the extent of solvent absorption, particularly in the vapor phase contact. In general, a good solvent such as an aromatic or terpene hydrocarbon solvent may have the plastic exposed to its dilute vapors at temperatures up to 100° C., usually 70 to 200° F., for a period of fifteen seconds to a non-critical longer period such as thirty minutes, usually from one to ten minutes being adequate to impart substantially adhered metal coating characteristics to the molded polystyrene.

In an alternate and preferred liquid phase pretreatment step, the organic polystyrene non-solvent may either be omitted or used in quantity insufficient to completely dissolve the polystyrene solvent, and the polystyrene solvent is then suspended, carried as an emulsion therewith, or otherwise dispersed in water furthr including, if desired, some organic polystyrene non-solvent. For this purpose a surface-active agent is added to the immiscible mixture of water and polystyrene solvent in any order. The polystyrene solvent may become very finely dispersed in the aqueous phase with usual homogenization or agitation in varying degree of dispersion, variable with the specific components.

A desirable and preferred form of surface-active compound which may be used for suspending the polystyrene solvent in water or solution of water in a polystyrene non-solvent is an ethoxylated compound that is miscible in the polystyrene solvent and miscible in water. Such surface-active agent allows heavier loading in stable form of the surface of the polystyrene with solvent while avoiding blistering or surface deformation of the plastic, and comprises typically a polyethyleneoxy compound having a hydrophobic portion of the molecule and a hydrophyllic portion containing ethylene oxide. Examples of ethoxylated compounds suitable for use are the water miscible ethoxylated: octyl phenols, nonyl phenols, polyoxypropylenes, fatty acids, fatty alcohols, fatty amines, fatty diamines, and fatty amides; and the salts, ethers, organic and inorganic esters, halogenated products, and sulfonates of the ethoxylated compounds are also exemplary of such materials. Many suitable ethoxylated compounds have the general formula R—X(OCH$_2$CH$_2$)$n$OH. The hydrophobic portion of the molecule R is hydrocarbon, such as an alkyl, typically hexyl, octyl, nonyl, decyl, hexadecyl, having from 6 to 24 carbon atoms, or an alkyl aryl compound in which the alkyl ranges from about 2 to 24 carbon atoms, the latter preferably having 1 to 3 alkyl substituents on a benzene ring; alkyl substituents being typically, diisopropyl, diisobutyl, nonyl, independent dialkyls such as two isooctyl radicals, two nonyl radicals, one n-decyl radical and combinations thereof with one or two methyl or ethyl gourps on the ring, thus forming a mono, di or tri-alkyl benzene radical of which the shortest single alkyl chain thereon is at least a six carbon atom alkyl such as diisopropyl. In the above formula X may be omitted, or it may be a member of the group consisting of —O—, —S—,

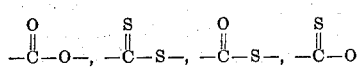

(CH$_2$CH$_2$O) is an ethyleneoxy group; and $n$ is a whole number ranging from about 5 to 60, preferably from about 11 to 30. The salts, ethers, polyether alcohols, organic and inorganic esters, halogenated products, and sulfonates of the ethoxylated compounds denoted by the above formula may also be used. The surface-active compound is used in any small, non-critical quantity, usually on the order of 1% by volume or more.

Examples of suitable ethoxylated surface-active agents include typically octyl and nonyl phenoxy (ethyleneoxy) ethanol with 13 and 16 mols of ethylene oxide per mol of hydrophobe; N, N polyoxyethylene N tallow, 1,3-diamino propane containing an average of 15 mols of ethylene oxide per mol of hydrophobe; polyethoxylated (20 mols) oleyl amine; polyethoxylated (19 mols) stearic acid; polyethoxylated (22 mols) hydrogenated tallow amide; the ethoxylated polyoxypropylene having a number average molecular weight of approximately 2900 grams/mol and an ethylene oxide content of 40 weight percent; polyethoxylated (16 mols) myristyl alcohol; polyethoxylated (25 mols) hexadecyl phenol; ethoxylated (10 mols) p-phenol sulfonic acid; nonyl phenoxy vinyl ether containing 12 mols and ethylene oxide, and mixtures thereof.

It should be understood that various of the foregoing polyethoxylated agents fall in different classifications as to the nature of their activity, some being nonionic, some being cationic, and some being anionic.

When the preferred ethoxylated type surfactants as described above are utilized, it is found that enhanced results may be obtained when the water-solvent system maintained by the ethoxylated material has added to it a quantity sufficient of alkali metal hydroxide, for example, sodium or potassium hydroxide, to cause the dispersion to appear substantially clear. At this point the dispersion is quite alkaline, with a pH running preferably in excess of 11.

Non-polyethoxylated surface-active agents may be used in certain instances, although they are not preferred. Such agents that may be used include alkali metal soaps of higher fatty acids, typically sodium stearate, alkali or ammonium soaps of sulfonic acids typically sodium lauryl sulafte, sodium dodecyl benzene sulfonate, higher alkyl dilower alkyl benzyl ammonium salts of a mineral acid such as cetyl dimethyl benzyl ammonium chloride.

It should be noted that it is sometimes desirable to use a mixture of the polyethoxylated agents with the non-polyethoxylated agents for purposes of stabilizing the dispersions.

A distinct advantage of the preferred pretreatment procedure is that the polymer still has a relatively high flash point, and thus presents little fire and explosion hazard.

As yet another alternate pretreatment, the polystyrene surface may be pretreated to plating-condition by exposing it to a gas or vapor which carries polymer solvent. In general, the polystyrene solvent is maintained in a desirably diluted state, within the previously stated quantity range. The solvent may be carried by a carrier gas in which polystyrene is insoluble. While such gas can contain water vapor, it is not essential that water vapor be present, nor is the character of the carrier gas critical. If desired, the treatment in gaseous or vapor phase may be accomplished by first preparing a fluid medium containing a polystyrene solvent dissolved or dispersed in a non-soluble and/or water medium within the said quantity range. Thereafter, the liquid phase medium may be changed to the vaporous or gaseous state, as by heating, and the resulting gaseous or vaporous mixture is caused to contact the polystyrene surface.

Regardless which of the alternative pretreatment procedures is used, and whether the surface of the polymer material is wet by the liquid medium in which the polymer solvent is contained by solution or dispersion, or merely contacted with a vaporous medium in which the solvent is present in the vapor state, the dilution of the solvent in the medium to which the molded polymer is exposed serves to control the very small amount needed to be absorbed in the plastic surface, thereby conditioning the molded surface to accept a strongly-adhered metal coating. Whichever of the alternative pretreatment procedures is used, the contact preferably occurs at a treating fluid temperatures range of about 70° F. to about 200° F., and with the polymer solvent in a concentration range of 0.25 to 25% by volume of the total treating fluid.

Following the exposure of the plastic for pretreatment of its surface, preparatory to further metal coating, either by homogeneous solution or dispersion or solvent vapor as described above, the treated molded polymer product may be empirically washed or dried and will be observed to have no noticeable change in empirical appearance.

Following the pretreatment of the plastic surface with a controlled amount of solvent applied by any one of the the several methods described, the empirically rinsed or dried surface is then etched in a second step by an oxidizing solution comprising hexavalent chromium in strong sulfuric acid in water. Such oxidizing etch is known in the art for plastics generally when applied as a concentrated sulfuric acid solution. It usually contains hexavalent chromium in lower content, less than about 1% by weight calculated as hexavalent chromium; it has a density of at least 1.67 grams per cc. and usually higher; and it is not usually saturated in hexavalent chromium ion. The molded polymer product is dipped in such acid oxidizing solution for several minutes, following the prior art practice for this and other plastics needing an oxidizing etch, and is then washed to remove the acid oxidizing solution. The plastic may then be treated in a sensitizing step, which will be explained in more detail at a later point herein.

While the etch procedure (sometimes called herein the "oxidizing" or "oxidation" step) referred to above may be used, there are many disadvantages in this particular acid etch solution which, in another aspect of this invention, applicant here markedly improves. For instance, the very strong and highly hygroscopic concentrated sulfuric acid involved in the prior art practice tends to absorb large quantities of water from the air in use over a relatively short period of open air exposure and becomes diluted and thereby reduced in the critical gravity. Consequently, in relatively short sequential periods, the gravity of the solution must be adjusted by adding more concentrated acid as well as hexavalent chromium to maintain the density heretofore considered to be critically essential.

Superior results are obtained if the old acid solution is replaced by one in which hexavalent chromium ion is in a substantially saturated condition with respect to the acid solution, and in which the total hexavalent chromium content of a freshly prepared solution prior to use is at a critical minimum of about 1¼ percent by weight, calculated as hexavalent chromium. For the purpose of mixing such an acid solution, a moderately strong sulfuric acid solution having a comparatively low gravity of acid, e.g., of a density of about 1.1 to 1.5 grams per cc. (before addition of the chromium), may be used. Such acid has added thereto hexavalent chromium, as by addition of potassium dichromate or chromium trioxide, and the solution is concentrated in hexavalent chromium, usually by heating to evaporate water until some of the chromium precipitates from the solution, indicating full saturation at the evaporating temperature of hexavalent chromium, or by addition of acid or hexavalent chromium in quantity sufficient to obtain saturation with hexavalent chromium. When chromium trioxide is observed to precipitate, the solution may be slightly diluted with a minor amount of water, up to about 5 percent by weight, which is usually merely sufficient to bring the precipitated hexavalent chromium compound back into a clear acid solution saturated with hexavalent chromium. Hence, the solution remains substantially saturated in hexavalent chromium ion. In that stage, even though the density of the sulfuric acid is well below the maximum normally used, for instance seldom more than about 1.55, the hexavalent chromium therein is in a substantially saturated condition. The sulfuric acid limit of concentration is not critical and may be as low an 1.01 grams per ml., since by water evaporation at the operating temperature (e.g. about 175° F.), the acid solution is brought up to a substantially higher concentration, such as about 1.55, or other desired value. The hexavalent chromium content at saturation may vary from about 1¼ percent by weight to about 32 percent by weight of hexavalent chromium (calculated as hexavalent chromium) in a freshly-prepared oxidizing solution. In such a solution the preferred hexavalent chromium content at saturation ranges from about 7 percent to about 16 percent by weight. The new acid solution, saturated in hexavalent chromium, does not absorb water, but instead water occasionally must be added to replace that lost to evaporation at operating temperature.

It is also found that the further treatment in a small quantity of an aqueous solution of any one or more of the above-identified ethoxylated compounds which have been esterified with a strong lower organic or a multivalent mineral acid such as monochloroacetic, methyl acrylate, oxalic, formic, phthalic, tartaric and citric, typical of organic acid components or phosphoric and sulfuric typical of multivalent mineral acid components, the ester imparts a sensitizing, catalytic-receptive effect to the surface for further treatment. The phosphoric mono and di-esters of the ethoxylated hydrophobes are preferred.

By such treatment of the plastic surface it is sensitized to be receptive to coating with a noble metal, preferably in active colloidal form according to the next step.

Esterified compounds with one or two remaining free replaceable hydrogen atoms may be neutralized with alkali such as sodium hydroxide or ammonia to form a mono- or dialkali or ammonium salt such as mono or disodium phosphate ester and the resulting compounds can be used to make a sensitizing solution.

As a sensitizer, phosphoric or sulfuric ester compounds and mixtures thereof which have been converted to phosphate esters or sulfate esters may be used such as the phosphate mono ester of an octyl or nonyl phenoxypoly (ethyleneoxy) ethanols containing an average of about 25 mols of ethylene oxide per mol of hydrophobe (a commercially available example being Rohm and Haas XOS–7), and the sulfuric acid ester of octyl or nonyl phenoxypoly (ethyleneoxy) ethanols having 35 mols of ethylene oxide per mol of hydrophobe.

The sensitizer is used in water solution in a wide range of concentrations, ranging from about .001 to 15% by weight.

For typical rack inhibiting, the sensitizer compound of approximately 50% by weight mono ester and 50% by weight diester prepared by reacting nonylphenoxypoly (ethyleneoxy) ethanols containing an average of 9 mols of ethylene oxide per mol of hydrophobe with polyphosphoric acid is preferred and may be used in the range of about 0.04 to about 0.2% by weight. This particular compound is a preferred embodiment and has yielded best results to date in inhibiting such plating. A commercially available example of such material is Gafac RE 610 (General Aniline and Film Corporation).

Following the treatment of the plastic with the oxidizer solution, it may be dipped in a stannous chloride solution dissolved in hydrochloric acid followed after washing with water, and then treated by dipping in a dilute salt solution of a noble metal such as platinum, palladium, gold or rhodium salts. Usually such chloride is dissolved in hydrochloric acid at a low pH such as below about 2.5, and usually in the range of 1.1 to 2.5 for several minutes. It has been found, however, as another aspect of the present invention, that where the plastic following the oxidizing etch has then been treated with an ester of a polyethyleneoxy compound, as defined above, the plastic becomes sensitized to accept the noble metal activator directly from a colloidal mixture or suspension, as explained in U.S. Pat. 3,011,920, issued Dec. 5, 1961, to Charles R. Shipley, Jr. The noble metal in colloidal admixture with the tin salt becomes reduced to a colloidal noble metal form, firmly adherent to the etched and then polyethoxy ester sensitized pretreated plastic body, whereby a strong electroless metal coating will firmly plate directly thereto.

Moreover, as preferred herein a saturated hexavalent chromium acid etch step has been previously conducted whereby great firmness is available in adherency of the plate to the sensitized plastic.

Furthermore, when after an oxidizing step conducted with the novel saturated hexavalent chromium ion acid etch solution, a specific sensitizer comprising in quantity about 0.04 to about 0.2% by weight of the above described solution of phosphoril alid mono and diester of nonyl phenoxypoly (ethyleneoxy) ethanols, e.g., Gafac RE 610 is used, the mono- or diesters may be used individually or in combination, but it is preferred that they be used together in relative quantity in the range of 4:1 to 1:4 by weight.

For final procedure to complete the plating, the washed noble metal coated plastic is preferably given an accelerator treatment which, as known in the art (see U.S. Pat. 3,011,920, to Shipley), is an oxidizing agent such as perchloric acid or palladium chloride which is then washed from the plastic surface with water. The thus treated plastic is now ready for an electroless plate; for instance, by giving it a nickel coating in an acid nickel hypophosphite bath at moderately raised temperatures such as 140 to 160° F., or in an alkaline bath at about 60 to 90° F. Such electroless bath follows the procedures as known in the art and comprises typically 20 volume percent admixture of Macuplex nickel concentrate and 4 volume percent of Macuplex nickel reduced concentrate in 76 voume percent of water, the pH being adjusted to 4.8 to 5.

It is to be particularly noted that the blend of ABS polymer and polystyrene of the present invention is a blend of distinct preformed polymeric materials. They are not in any sense a copolymer, a mixture of monomers, of the several materials. For instance, ABS per se is a copolymer of styrene and acrylonitrile in which rubber is dissolved. That ABS usually is the product of from about 25 to 40% of acrylonitrile and 40 to 68% of styrene in monomeric form in which is dissolved 2 to 35% of preformed rubber, usually polybutadiene, the quantity based upon the weight percent of these components. The ABS is then polymerized, preferably by suspension polymerization, to bead form in which form it is ready for plating with the polystyrene impact.

Similarly the polyestyrene impact is formed of styrene monomer in which is dissolved from 3 to 20% of rubber, preferably polybutadiene, and monomeric solution of rubber is then suspension polymerized to bead form. Both the polystyrene impact and ABS beads can be first extruded into pellets which are then blended to impart a 3 to 10 or 15% ABS polymer content to the polystyrene impact and forwarded as a blend of pellets to the molder. However, it is preferred to blend the ABS beads with the polystyrene beads and extrude the blend into strands which after cooling are chopped into pellets and the extruded pellets comprising the 3 to 15% blend of ABS in polystyrene impact or polystyrene which is then supplied to the molder as pellets. The beads after blending may be supplied to the molder as such or the blend may be crushed into flakes for more ready casting by various procedures such as by rotocasting after blending. Moreover, the polymers in fine granules or dust as formed by other procedures can be blended before molding. Thus, the polystyrene and polystyrene impact particles are supplied to the molder in the blended form most desirably suited to his molding procedures; beads, pellets, granules or flakes.

These pellets are then used by the molder to form whatever polystyrene parts are to be molded, the parts then being electroplated by procedures defined in the companion application referred to.

The invention is further illustrated with regard to the specific working examples here submitted which are to be regarded as illustrative and not limiting.

EXAMPLE I 90 parts of high impact polystyrene containing 5.66 percent of polybutadiene rubber, were blended with ten parts of acrylonitrile butadiene styrene polymer containing 10.7 percent polybutadiene, 25% acrylonitrile and 64.3 percent styrene in the form of small granules and compounded using a two inch diameter extruder with a 20:1 $L/D$. The product exited the extruder in the form of small strands which were subsequently cooled and chopped to form pellets. The pellets were subsequently molded on a screw injection press to form specimens for plating of approximately three inches by four inches. The specimens were subsequently treated in accordance with the procedure as outlined in copending application Ser. No. 726,270 as identified above. The following cycles were used for the preplating baths:

| | |
|---|---|
| Pretreat | 1 minute. |
| Wash | 4 minutes at 110° F. |
| Etch | 6 minutes at 160° F. |
| Sensitize | 1½ minutes. |
| Activate | 1 minute. |
| Accelerate | 1½ minutes. |
| Electroless nickel | 7 minutes. |

The following cycles were used for the plating baths:

| | |
|---|---|
| Semi-bright nickel | 5 minutes at 6 volts. |
| Bright acid copper | 20 minutes at 1½ volts. |
| Bright nickel | 5 minutes at 6 volts. |

After electroplating, the specimens were visually inspected for surface flaws and found to be satisfactory. The adhesion of the metal film to the plastic substrate was measured using an "Instron" peel test machine and was found to have a peel strength of from 3 to 5 pounds per inch.

EXAMPLE II 85 parts of high impact polystyrene containing 5.66% polybutadiene rubber were blended with 15 parts of acrylonitrile butadiene styrene polymer containing 10.7% polybutadiene, 25% acrylonitrile, and 64.3% styrene. This blend was compounded, processed through the preplate baths, and electroplated using the procedure as described in Example I. The plated specimens were visually inspected and the surfaces found to be satisfactory. The plated specimens were found to have a peel strength of ½ to 1 pound per inch.

EXAMPLE III 92 parts of high impact polystyrene were blended with 8 parts of acrylonitrile butadiene styrene polymer as in Example I. This blend was compounded, processed through the preplate baths and eletcroplated using the same procedure as that described in Example I. The surfaces of the plated specimens were visually inspected and found to be satisfactory. The plated parts were found to have a peel strength of from 3 to 5 pounds per inch.

EXAMPLE IV 94 parts of high impact polystyrene were blended with 6 parts of acrylonitrile butadiene styrene polymer as described in Example I. The blend was compounded as exactly described in Example I using the same procedures and was found, upon visual inspection, to have a satisfactorily plated surface. The peel strength of the plated parts upon testing was found to be from 4 to 5 pounds per inch.

EXAMPLE V 95 parts of high impact polystyrene were blended with 5 parts of acrylonitrile butadiene styrene polymer using the same blending compound procedure as that described in Example I. The surface was found to be satisfactory with a peel strength of from 4 to 5 pounds per inch.

EXAMPLE VI

The processing as described in Example I was repeated, substituting 96 parts of high impact polystyrene and 4 parts of acrylonitrile butadiene styrene polymer. The surface characteristics were found to be only marginal for commercial use and the peel strength remained at 4 to 5 pounds per inch.

EXAMPLE VII 98 parts of high impact polystyrene containing 5.66 percent of polybutadiene rubber were blended with two parts of acrylonitrile butadiene styrene polymer as described in Example I. The blend was compounded using the same procedure as that described in Example I and upon inspection the surface of the plating was found to be unsatisfactory for commercial purposes. The peel strength upon testing was found to be 5 to 6 pounds per inch.

EXAMPLE VIII 99.75 parts of high impact polystyrene containing 5.66 percent of polybutadiene rubber were blended with .25 part of acrylonitrile butadiene styrene polymer as described in Example I. Upon inspection the surface was found to be unsatisfactory although the peel strength was found to be 4 to 5 pounds per inch.

EXAMPLE IX 100 parts of high impact polystyrene exactly as described in the above examples was processed as in Example I. The surface was found to be unsatisfactory. The peel strength upon testing was found to be 8 to 10 pounds per inch.

Various modifications may occur to those skilled in this art. Accordingly the appended specification and examples are to be regarded as exemplary and not limiting except as defined in the claims appended hereto.

What is claimed is:

1. A metal plated polymer molded from polymer particles moldable into parts useful for bright plating, said particles comprising a blend of 2 to 15 percent of acrylonitrile butadiene styrene terpolymer with the remainder a polymer of the group consisting of polystyrene and polystyrene and rubber, said acrylonitrile butadiene styrene terpolymer consisting of a copolymerized solution of acrylonitrile and styrene monomers having 1 to 40 percent of polybutadiene dissolved therein, the styrene being present in quantity of about 60-90 percent of the total monomers and the acrylonitrile being present in quantity of about 10 to 40 percent of the total monomers, the quantities being by weight, said particles being then molded and plated.

2. The product as defined in claim 1 wherein the moldable product is substantially polystyrene and rubber blended with from about 3 to 15 percent of acrylonitrile butadiene styrene terpolymer.

3. The product as defined in claim 1 wherein the moldable product is substantially polystyrene and rubber blended with from about 3 to 10 percent of ABS terpolymer.

4. The method of electrically plating a polystyrene of the group consisting of crystal polystyrene and polystyrene and rubber comprising blending said polystyrene substance with from about 2 to 15 percent of ABS copolymer, said ABS copolymer consisting of a copolymerized solution of acrylonitrile and styrene monomers having 1 to 40% of polybutadiene dissolved therein, the styrene being present in quantity of about 60 to 90 percent of the total monomers and the acrylontirile being present in quantity of about 10 to 40 percent of the total monomer, the quantities being by weight, forming said blend into a molded body and then metal plating said molded body.

5. The method as defined in claim 4 wherein the ABS copolymer is present in said blend in quantity of from about 3 to 10 percent.

References Cited
UNITED STATES PATENTS

| | | | |
|---|---|---|---|
| 3,533,828 | 10/1970 | Rowe | 204—30 |
| 3,445,350 | 5/1969 | Klinger et al. | 204—20 |
| 3,053,800 | 9/1962 | Grabowski et al. | 260—876 |
| 3,315,285 | 4/1967 | Farmer | 117—47 A |

GERALD L. KAPLAN, Primary Examiner

T. TUFARIELLO, Assistant Examiner

U.S. Cl. X.R.

117—160; 204—20, 30; 260—876